(12) United States Patent
Kim et al.

(10) Patent No.: US 8,293,839 B2
(45) Date of Patent: Oct. 23, 2012

(54) POLYCARBONATE-POLYSILOXANE COPOLYMER RESIN COMPOSITION WITH HIGH IMPACT STRENGTH AT LOW TEMPERATURE AND MECHANICAL STRENGTH AND METHOD FOR PREPARING THE SAME

(75) Inventors: Bo Young Kim, Uiwang-si (KR); Jong Cheol Lim, Anyang-si (KR); Tae Gon Kang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 558 days.

(21) Appl. No.: 12/485,227

(22) Filed: Jun. 16, 2009

(65) Prior Publication Data

US 2009/0253856 A1    Oct. 8, 2009

Related U.S. Application Data

(63) Continuation-in-part of application No. PCT/KR2007/006993, filed on Dec. 28, 2007.

(30) Foreign Application Priority Data

Dec. 29, 2006  (KR) .................. 10-2006-0137986

(51) Int. Cl.
*C08L 69/00*  (2006.01)
(52) U.S. Cl. ........... 525/67; 525/65; 525/101; 525/109; 525/463; 525/464; 549/215
(58) Field of Classification Search .................. None
See application file for complete search history.

(56) References Cited

U.S. PATENT DOCUMENTS

| 4,994,532 | A | | 2/1991 | Hawkins et al. |
| 5,194,524 | A | | 3/1993 | Peters |
| 5,508,344 | A | * | 4/1996 | Mason et al. .................. 525/65 |
| 5,530,083 | A | | 6/1996 | Phelps et al. |
| 5,623,026 | A | | 4/1997 | Buekers et al. |
| 6,121,378 | A | * | 9/2000 | Miyawaki et al. ............ 525/100 |
| 2003/0191245 | A1 | * | 10/2003 | Nodera et al. ................ 525/100 |
| 2009/0043038 | A1 | * | 2/2009 | Rogunova et al. ............ 524/504 |

FOREIGN PATENT DOCUMENTS

| JP | 05262960 | * | 10/1993 |
| JP | 08-48781 | | 2/1996 |
| JP | 11043597 | * | 2/1999 |
| JP | 2004035587 A | | 2/2004 |
| KR | 1020050049127 A | | 5/2005 |
| WO | WO 03/018692 | * | 3/2003 |
| WO | 2008/082223 A1 | | 7/2008 |

OTHER PUBLICATIONS

International Search Report in counterpart International Application No. PCT/KR2007/006993, mailed Mar. 25, 2008.

* cited by examiner

*Primary Examiner* — David Buttner
(74) *Attorney, Agent, or Firm* — Summa, Additon & Ashe, P.A.

(57) ABSTRACT

Disclosed herein is a polycarbonate-polysiloxane copolymer resin composition comprising: (A) about 100 parts by weight of a thermoplastic polycarbonate resin; and (B) about 0.1 to about 30 parts by weight of an organo-siloxane polymer having an epoxy group. The polycarbonate-polysiloxane copolymer resin composition has high impact strength at low temperature and high mechanical strength.

13 Claims, No Drawings

POLYCARBONATE-POLYSILOXANE COPOLYMER RESIN COMPOSITION WITH HIGH IMPACT STRENGTH AT LOW TEMPERATURE AND MECHANICAL STRENGTH AND METHOD FOR PREPARING THE SAME

CROSS-REFERENCE TO RELATED APPLICATIONS

This non-provisional application is a continuation-in-part application of PCT Application No. PCT/KR2007/006993, filed Dec. 28, 2007, pending, which designates the U.S. and which is hereby incorporated by reference in its entirety, and claims priority therefrom under 35 USC Section 120. This application also claims priority under 35 USC Section 119 from Korean Patent Application No. 10-2006-0137986, filed Dec. 29, 2006, the entire disclosure of which is also hereby incorporated by reference.

FIELD OF THE INVENTION

The present invention relates to a polycarbonate-polysiloxane copolymer resin composition.

BACKGROUND OF THE INVENTION

Polycarbonate-polysiloxane copolymers and methods for preparing the same have been widely studied for many years. In general, polycarbonate-polysiloxane copolymers have been prepared by interfacial polymerization processes. For example, U.S. Pat. No. 5,530,083 discloses an interfacial phosgenation process in which an aromatic dihydroxy compound, phosgene and a catalyst react with diorganopolysiloxane having terminal hydroxyaryl groups. However, this process uses an environmentally hazardous chlorinated solvent.

U.S. Pat. No. 4,994,532 discloses a technique for preparing a polycarbonate-polysiloxane copolymer by melt blending a polydimethylsiloxane having carboxylic acid functional groups with a polycarbonate resin. Further, U.S. Pat. No. 5,194,524 discloses a technique for preparing a copolymer by reaction and extrusion of a siloxane compound having at least one secondary amine group and a polycarbonate resin in a conventional extruder. According to the '524 patent, a polysiloxane having secondary amine functional groups is more effective in the reaction and extrusion process than a polysiloxane having primary amine functional groups because a primary amine has relatively low hydrolysis stability. However, the copolymers can have low temperature impact strength and mechanical strength even though the process is simple and can be performed in a conventional melt extruder.

SUMMARY OF THE INVENTION

The present invention relates to a polycarbonate-polysiloxane copolymer resin composition comprising a polycarbonate resin and an organo-siloxane polymer having an epoxy group and a method for preparing the same. The polycarbonate-polysiloxane copolymer resin composition of the invention can have both excellent low temperature impact strength and mechanical strength. The polycarbonate-polysiloxane copolymer resin composition of the invention further can exhibit an excellent balance of physical properties such as impact resistance, thermal stability, workability, and external appearance characteristics.

According to the present invention, there is provided a polycarbonate-polysiloxane copolymer resin composition comprising (A) about 100 weight parts of a thermoplastic polycarbonate resin and (B) about 0.1 to 30 weight parts of an organo-siloxane polymer having an epoxy group.

In one embodiment, the polycarbonate-polysiloxane copolymer resin composition can have an impact strength of about 18 kgf·cm/cm or more at 23° C. and an impact strength of about 15 kgf·cm/cm or more at −30° C., respectively, measured in accordance with ASTM D-256 using a ¼" thick test sample, a flexural modulus of about 18,000 kgf/cm$^2$ or more measured in accordance with ASTM D790 using a ¼" thick test sample, and a brittle fracture ratio of about 45% or less for a flat plate specimen with dimensions of 2 mm×50 mm×200 mm measured after the test specimen is exposed to −30° C. for 48 hours.

The resin composition may further comprise about 10 weight parts or less of an impact modifier in order to further improve impact strength.

The impact modifier may be a core-shell graft copolymer. In one embodiment, when the core-shell graft copolymer is used as the impact modifier, the polycarbonate-polysiloxane copolymer resin composition can have an impact strength of about 75 kgf·cm/cm or more at room temperature (23° C.) and an impact strength of about 27 kgf·cm/cm or more at a low temperature of −30° C., respectively, measured in accordance with ASTM D256 using a ¼" thick test sample, a flexural modulus of about 18,000 kgf/cm$^2$ or more measured in accordance with ASTM D790 using a ¼" thick test sample, and a brittle fracture ratio of about 10% or less for a flat plate specimen with dimensions of 2 mm×50 mm×200 mm measured after the test specimen is exposed to −30° C. for 48 hours.

In another exemplary embodiment of the invention, the impact modifier may be an ethylene/alkyl(meth)acrylate copolymer.

Another aspect of the present invention relates to a method for preparing a polycarbonate-polysiloxane copolymer resin composition. In one embodiment, the method comprises melt-kneading (melt mixing or melt blending) a thermoplastic polycarbonate resin with an organo-siloxane polymer having an epoxy group, and extruding the melt-kneaded (melt mixed or melt blended) mixture.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate-polysiloxane copolymer resin composition of the present invention comprises (A) a thermoplastic polycarbonate resin and (B) an organo-siloxane polymer having an epoxy group. Hereinafter, the present invention will be described in more detail.

(A) Polycarbonate Resin

The polycarbonate resin of the present invention is prepared by reacting a diphenol represented by the following Chemical Formula 1 with a phosgene, a halogen formate or a carbonic diester.

[Chemical Formula 1]

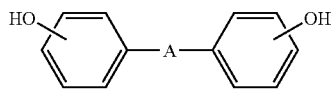

wherein A is a single bond, substituted or unsubstituted $C_1$-$C_5$ alkylene, substituted or unsubstituted $C_1$-$C_5$ alkylidene, substituted or unsubstituted $C_{3-6}$ cycloalkylene, substituted or unsubstituted $C_5$-$C_6$ cycloalkylidene, substituted or unsubstituted $C_{2-5}$ alkenylene, substituted or unsubstituted $C_{5-6}$ cycloalkenylene, CO, —S—, or —$SO_2$—.

Examples of the diphenol represented by Chemical Formula 1 may include without limitation hydroquinone, resorcinol, 4,4'-dihydroxydiphenyl, 2,2-bis-(4-hydroxyphenyl)-propane (also referred to in the art as "bisphenol-A"), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof.

In the present invention, the polycarbonate resin can have a weight average molecular weight (Mw) of about 10,000 to about 500,000, for example about 20,000 to about 100,000.

In accordance with various embodiments of the invention, suitable polycarbonates incorporated into the composition of the present invention may be branched in a known manner, for example by incorporating about 0.05 to about 2 mol %, based on the total quantity of diphenols used, of a tri- or higher poly-functional compound, for example, those with three or more phenolic groups.

A homopolymer of polycarbonate, a copolymer of polycarbonate, or a combination thereof may be used in the preparation of resin composition of the present invention.

(B) Organo-Siloxane Polymer Including Epoxy Group

The organo-siloxane polymer used in the preparation of the resin composition of the present invention comprises at least one siloxane polymer having an epoxy group represented by the following Chemical Formulae 2, 3 or 4, or a combination thereof.

[Chemical Formula 2]

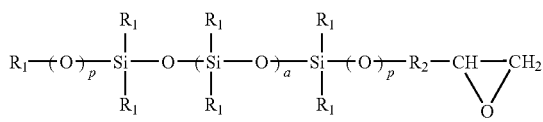

wherein:
each $R_1$ is independently hydrogen, $C_1$-$C_8$ alkyl, $C_6$-$C_{30}$ aryl, or $C_1$-$C_{15}$ alkyl-substituted $C_6$-$C_{30}$ aryl;
$R_2$ is $C_1$-$C_8$ alkylene;
each p is independently 0 or 1; and
a represents the number of repeating units and is an integer from 1 to 10.

For example, each $R_1$ can independently be hydrogen, methyl, ethyl, propyl, isopropyl, butyl, sec-butyl, t-butyl, isobutyl, isoamyl, or t-amyl.

$R_2$ can be methylene, ethylene, propylene, isopropylene, butylene, sec-butylene, or t-butylene, and a can be 3 to 6.

[Chemical Formula 3]

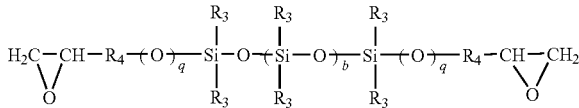

wherein:
each $R_3$ is independently hydrogen, $C_1$-$C_8$ alkyl, $C_6$-$C_{30}$ aryl, or $C_1$-$C_{15}$ alkyl-substituted aryl;
$R_4$ is $C_1$-$C_8$ alkylene;
each q is independently 0 or 1; and
b represents the number of repeating units and is an integer from 1 to 10.

For example, each $R_3$ can independently be hydrogen, methyl, ethyl, propyl, isopropyl, butyl, sec-butyl, t-butyl, isobutyl, isoamyl, or t-amyl.

$R_4$ can be methylene, ethylene, propylene, isopropylene, butylene, sec-butylene, or t-butylene, and b can be 3 to 6.

[Chemical Formula 4]

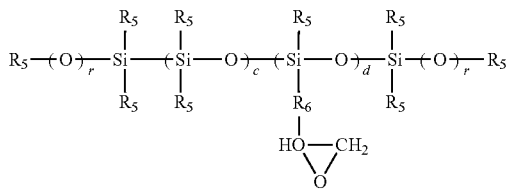

wherein:
each $R_5$ can independently be hydrogen, $C_1$-$C_8$ alkyl, $C_6$-$C_{30}$ aryl, or $C_1$-$C_{15}$ alkyl-substituted aryl;
$R_6$ is $C_1$-$C_8$ alkylene;
each r is independently 0 or 1; and
c and d represent a ratio of repeating units, and the ratio of c to d ranges from about 99.1:0.1 to about 50:50, for example about 99.5:0.5 to 55:45.

For example, each $R_5$ can be independently hydrogen, methyl, ethyl, propyl, isopropyl, butyl, sec-butyl, t-butyl, isobutyl, isoamyl, or t-amyl.

$R_6$ can be methylene, ethylene, propylene, isopropylene, butylene, sec-butylene, or t-butylene.

The organo-siloxane polymer having an epoxy group used in the preparation of a resin composition of the present invention can have a viscosity of about 1 to about 50,000 centistokes (cSt), for example about 1 to about 10,000 centistokes, at about 25° C.

In the present invention, the organo-siloxane polymer (B) having an epoxy group can be used in an amount of about 0.1 to about 30 weight parts, for example about 0.2 to about 20 weight parts, and as another example about 0.5 to about 15 weight parts, based on about 100 weight parts of the polycarbonate resin (A). When such a range is used, excellent mechanical properties can be obtained.

(C) Impact Modifier

In the present invention, a conventional impact modifier can be optionally included to improve impact strength.

In the present invention, a core-shell graft copolymer may be used as the impact modifier. The core-shell graft copolymer will be described in detail hereinafter.

Core-Shell Graft Copolymer

The core-shell graft copolymer is a core-shell graft copolymer prepared by graft-polymerizing a rubber polymer with a monomer, such as an aromatic vinyl compound, a vinyl cyanide compound, a $C_1$-$C_8$ alkyl (meth)acrylate ester, maleic anhydride, maleimide, or a combination thereof, with a rubber polymer.

For example, the core-shell graft copolymer can be prepared by graft-polymerizing about 5 to about 95% by weight of at least one monomer (C-1) selected from styrene, α-methyl styrene, halogen or $C_1$-$C_8$ alkyl-substituted styrene, $C_1$-$C_8$ alkyl methacrylate ester, $C_1$-$C_8$ alkyl acrylate ester, acrylonitrile, methacrylonitrile, maleic anhydride, or $C_1$-$C_4$ alkyl, phenyl N-substituted maleimide, or a combination thereof, with about 5 to about 95% by weight of a rubber polymer (C-2) selected from butadiene rubber, acrylic rubber, ethylene/propylene rubber, styrene/butadiene rubber, acrylonitrile/butadiene rubber, isoprene rubber, ethylene propylene diene monomer (EPDM), polyorganosiloxane/polyalkyl (meth)acrylate rubber composite, or a combination thereof.

The $C_1$-$C_8$ alkyl methacrylate ester or the $C_1$-$C_8$ alkyl acrylate ester can be obtained from methacrylic acid or acrylic acid respectively and a monohydryl alcohol containing 1 to 8 carbon atoms. Examples of the $C_1$-$C_8$ alkyl methacrylate ester or the $C_1$-$C_8$ alkyl acrylate ester include without limitation methyl methacrylate, ethyl methacrylate, ethyl acrylate, methyl acrylate, propyl methacrylate, and the like, and combinations thereof.

One embodiment of the core-shell graft impact modifier is a graft copolymer obtained by graft-copolymerizing a butadiene rubber, an acrylic rubber or a styrene/butadiene rubber with styrene, acrylonitrile, and optionally an alkyl (meth)acrylate ester monomer.

Another embodiment of the core-shell graft impact modifier is obtained by graft-copolymerizing a rubber polymer including a blend of a polyorganosiloxane/polyalkyl(meth)acrylate rubber with a butadiene rubber, an acrylic rubber, and/or a styrene/butadiene rubber, with a methyl (meth)acrylate ester monomer.

The rubber particles may have an average particle diameter ranging from about 0.05 to about 4 μm to improve impact resistance and surface characteristics of molded articles.

The graft impact modifier according to the present invention can be prepared using a conventional polymerization process such as emulsion polymerization, suspension polymerization, solution polymerization, or bulk polymerization. In emulsion and bulk polymerizations the monomers are added to the rubber polymer in the presence of a polymerization initiator.

In the present invention, a linear impact modifier such as an ethylene/alkyl(meth)acrylate copolymer may be used instead of the core-shell graft impact modifier. The linear impact modifier will be described in detail as follows.

Linear Impact Modifier

The ethylene/alkyl(meth)acrylate copolymer may be represented by the following Chemical Formula 5.

[Chemical Formula 5]

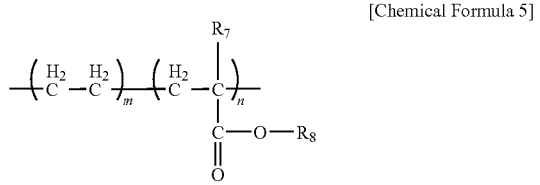

wherein:
$R_7$ is hydrogen or methyl;
$R_8$ is $C_1$-$C_{12}$ alkyl; and
m and n are the degree of polymerization, and a ratio of m to n is about 300:1 to about 10:90.

For example, $R_5$ can be methyl, ethyl, propyl, isopropyl, butyl, sec-butyl, t-butyl, isobutyl, isoamyl, or t-amyl.

The ethylene/alkyl(meth)acrylate copolymer may be a random copolymer, a block copolymer, a multi-block copolymer, a graft copolymer, or a combination thereof. The ethylene/alkyl (meth)acrylate copolymer may be readily prepared by one of ordinary skill in the art without undue experimentation.

In the present invention, a mixture of the core-shell graft copolymer and the ethylene/alkyl(meth)acrylate copolymer may also be used.

The impact modifier can be present in the composition of the invention in an amount of about 10 parts by weight or less, for example about 0.1 to about 7 parts by weight, and as another example about 0.5 to about 5.5 parts by weight, based on the total weight of a base resin including components (A)+(B) as described herein. The use of impact modifier in these ranges can provide desired mechanical strength to the composition.

The polycarbonate-polysiloxane copolymer resin composition of the present invention may further include conventional additives such as but not limited to flame retardants, flame retardant aids, lubricants, releasing agents, nucleating agents, antistatic agents, stabilizers, reinforcing agents, inorganic fillers, pigments, dyes, and the like. One of the additives may be used solely, or a combination of at least two thereof may also be used. The inorganic additive may be present in the composition of the invention in an amount of about 0 to about 60 parts by weight, for example about 1 to about 40 parts by weight, based on about 100 parts by weight of a base resin including components (A)+(B) as described herein.

The polycarbonate-polysiloxane copolymer of the present invention can be prepared by melt-blending the thermoplastic polycarbonate resin with the organo-siloxane polymer having an epoxy group and then extruding the melt-blended material. The melt-blended material can be extruded at a temperature of about 200 to about 300° C., for example about 250 to about 280° C. The composition can be extruded into pellet form. The pellets can be molded using a convention process into internal and external parts of electrical and electronic appliances such as television sets, washing machines, telephones, audio sets, video players, CD players, and the like.

The present invention will be more understood by the following examples. However, the following examples are only for illustrative purposes of the present invention and do not intend to limit the scope of the present invention defined by the appended claims.

EXAMPLES

The compound specifications of (A) the polycarbonate resin, (B) the organic siloxane polymer containing a primary amine group, and (C) the impact modifier used in the Examples and Comparative Examples will be described more fully hereinafter.

(A) Polycarbonate Resin

A bisphenol-A-based polycarbonate with a weight average molecular weight (Mw) of 22,500 is used.

(B) Organo-Siloxane Polymer (B-1) An organo-siloxane polymer having a dynamic viscosity of 15 centistokes (cSt) measured at 25° C. and represented by the aforementioned Chemical Formula 3, wherein b is 4, $R_3$ is methyl, $R_4$ is methylene; q is 0, is used.

(B-2) KF-96 produced by Shinetsu Corporation in Japan is used as a polydimethylsiloxane, and an organo-siloxane polymer without a functional group is used having a dynamic viscosity of 100 centistokes (cSt) measured at 25° C.

(B-3) X-22-160AS produced by Shinetsu Corporation in Japan is used as a siloxane polymer containing a carbinol group, and an organo-siloxane polymer is used, having a dynamic viscosity of 35 centistokes (cSt) measured at 25° C.

(C) Impact Modifier

Metablen C223A produced by MRC Corporation is used as a MBS-based core-shell graft impact modifier.

Examples 1-2 and Comparative Examples 1-3

The components as shown in Table 1 added with an antioxidant and a heat stabilizer are mixed in a conventional mixer and the mixture is extruded through a twin screw extruder with L/D=35 and Φ=45 mm into pellets. The resin pellets are molded into test specimens using a 10 oz injection molding machine at 280-300° C.

The physical properties of the test specimens are measured as follows and the results are shown in Table 1 below.

Methods for Measuring Physical Properties (1) Izod Impact Strength at room temperature: Room temperature notched izod impact strength is measured on a specimen with a thickness of ¼" according to ASTM D256 after leaving the specimen alone at a temperature of 23° C. and a relative humidity of 50% for 48 hours.

(2) Izod Impact Strength at low temperature: Low temperature notched izod impact strength is measured on a specimen with a thickness of ¼" according to ASTM D256 after leaving the specimen alone at a temperature of –30° C. for 48 hours.

(3) Flexural Modulus: The flexural modulus is measured on a specimen with a thickness of ¼" at a speed of 2.8 mm/min according to ASTM D790 after leaving the specimen alone at a temperature of 23° C. and a relative humidity of 50% for 48 hours.

(4) Brittle Fracture Ratio at low temperature: Low temperature brittle fracture ratio is measured on a specimen with dimensions of 2 mm×50 mm×200 mm by colliding with a sphere falling from a gate after leaving the flat plate specimen along at a temperature of –30° C. for 48 hours.

TABLE 1

|  |  | Examples | | Comparative Examples | | |
|---|---|---|---|---|---|---|
|  |  | 1 | 2 | 1 | 2 | 3 |
| (A) Polycarbonate resin | | 100 | 100 | 100 | 100 | 100 |
| (B) Organo- | B-1 | 2 | 2 | — | — | — |
| siloxane polymer | B-2 | — | — | 2 | — | 2 |
|  | B-3 | — | — | — | 2 | — |
| (C) impact modifier | | — | 3 | — | — | 3 |
| Notched impact strength at room temperature (¼", kgf·cm/cm) | | 20 | 78 | 19 | 16 | 73 |
| Notched impact strength at –30° C. (¼", kgf·cm/cm) | | 17 | 30 | 13 | 11 | 24 |
| Flexural modulus (kgf/cm²) | | 20,900 | 18,240 | 19,010 | 18,320 | 17,960 |
| Brittle fracture ratio (%) at –30° C. | | 40 | 0 | 70 | 50 | 30 |

It can be seen from the results of the Table 1 that the compositions of Examples 1 and 2 prepared by reaction and extrusion of a polycarbonate resin composition and an organo-siloxane polymer having an epoxy group according to the present invention simultaneously exhibit excellent low temperature impact strength and high flexural modulus as compared with the compositions of Comparative Examples 1 to 3 prepared using an organo-siloxane polymer without a functional group and an organo-siloxane polymer substituted with another functional group.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate-polysiloxane copolymer resin composition with high impact strength at low temperature and high mechanical strength, comprising:

(A) about 100 parts by weight of a thermoplastic polycarbonate resin; and (B) about 0.1 to about 30 parts by weight of an organo-siloxane polymer having an epoxy group represented by the following Chemical Formula:

[Chemical Formula 2]

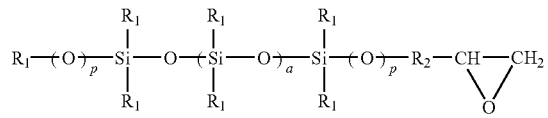

wherein:

each $R_1$ is independently hydrogen, $C_1$-$C_8$ alkyl, $C_6$-$C_{30}$ aryl, or $C_1$-$C_{15}$ alkyl-substituted $C_6$-$C_{30}$ aryl;

$R_2$ is $C_1$-$C_8$ alkylene;

each p is independently 0 or 1; and a represents the number of repeating units and is an integer from 1 to 10.

2. The polycarbonate-polysiloxane copolymer resin composition of claim 1, wherein each of said $R_2$ of said organic siloxane polymer having an epoxy group (B) is independently hydrogen methyl, ethyl, propyl, isopropyl, butyl, sec-butyl, t-butyl, isobutyl, isoamyl, or t-amyl.

3. The polycarbonate-polysiloxane copolymer resin composition of claim 1, wherein each of said $R_2$ of said organic siloxane polymer having an epoxy group (B) is independently methylene, ethylene, propylene, isopropylene, butylene, sec-butylene, or t-butylene.

4. The polycarbonate-polysiloxane copolymer resin composition of claim 1, wherein said organic siloxane polymer having an epoxy group (B) has a viscosity of about 1 to about 50,000 cSt at 25° C.

5. The polycarbonate-polysiloxane copolymer resin composition of claim 1, wherein said polycarbonate-polysiloxane copolymer resin composition has an impact strength of about 18 kgf·cm/cm or more at 23° C. and an impact strength of about 15 kgf·cm/cm or more at −30° C., respectively, measured in accordance with ASTM D-256 using a ¼" thick test sample, a flexural modulus of about 18,000 Kgf/cm² or more measured in accordance with ASTM D790 using a ¼" thick test sample, and a brittle fracture ratio of about 45% or less for a flat plate specimen with dimensions of 2 mm×50 mm×200 mm after exposing the specimen to −30° C. for 48 hours.

6. The polycarbonate-polysiloxane copolymer resin composition of claim 1, further comprising about 10 or less parts by weight of an impact modifier (C).

7. The polycarbonate-polysiloxane copolymer resin composition of claim 6, wherein said impact modifier (C) is a core-shell graft copolymer prepared by graft-polymerizing a monomer comprising an aromatic vinyl compound, a vinyl cyanide compound, a $C_1$-$C_8$ alkyl (meth)acrylate ester, maleic anhydride, maleimide, or a combination thereof with a rubber polymer.

8. The polycarbonate-polysiloxane copolymer resin composition of claim 7, wherein said the core-shell graft copolymer is prepared by graft-polymerizing about 5 to about 95% by weight of at least one monomer comprising styrene, α-methyl styrene, halogen- or $C_1$-$C_8$ alkyl-substituted styrene, $C_1$-$C_8$ alkyl methacrylate ester, $C_1$-$C_8$ alkyl acrylate ester, acrylonitrile, methacrylonitrile, a maleic anhydride, $C_1$-$C_4$ alkyl- or phenyl N-substituted maleimide, or a combination thereof with about 5 to about 95% by weight of a rubber comprising butadiene rubber, acrylic rubber, ethylene/propylene rubber, styrene/butadiene rubber, acrylonitrile/butadiene rubber, isoprene rubber, ethylene propylene diene monomer (EPDM), polyorganosiloxane/polyalkyl(meth)acrylate rubber composite or a combination thereof.

9. The polycarbonate-polysiloxane copolymer resin composition of claim 8, wherein said polycarbonate-polysiloxane copolymer resin composition has an impact strength of about 75 kgf·cm/cm or more at 23° C. and an impact strength of about 27 kgf·cm/cm or more at −30° C., respectively, measured in accordance with ASTM D-256 using a ¼" test sample, a flexural modulus of about 18,000 Kgf/cm² or more measured in accordance with ASTM D790 using a ¼" thick test sample, and a brittle fracture ration of about 10% or less for a flat plate specimen with dimensions of 2 mm×50 mm×200 mm after exposing the specimen to −30° C. for 48 hours.

10. The polycarbonate-polysiloxane copolymer resin composition of claim 6, wherein said impact modifier (C) is an ethylene/alkyl(meth)acrylate copolymer represented by the following Chemical Formula 5:

[Chemical Formula 5]

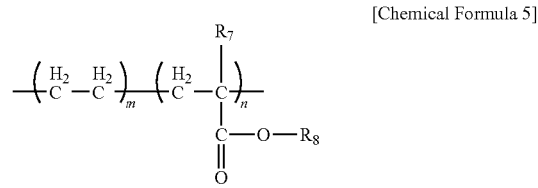

wherein:
R₇ is hydrogen or methyl;
R₈ is $C_1$-$C_{12}$ alkyl; and
m and n are degrees of polymerization and the ratio of m to n is about 300:1 to about 10:90.

11. The polycarbonate-polysiloxane copolymer resin composition of claim 6, further comprising an additive comprising a flame retardant, flame retardant aid, lubricant, releasing agent, nucleating agent, antistatic agent, stabilizer, reinforcing agent, inorganic filler, pigment, dye, or a combination thereof.

12. A molded article produced from the polycarbonate-polysiloxane copolymer resin composition as defined in claim 1.

13. A method for preparing a polycarbonate-polysiloxane copolymer resin composition comprising:
melt-mixing a thermoplastic polycarbonate resin and an organic siloxane polymer having an epoxy group of Chemical Formula 2,

[Chemical Formula 2]

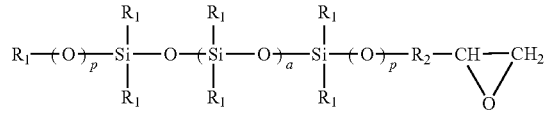

wherein:
each R₁ is independently hydrogen, $C_1$-$C_8$ alkyl, $C_6$-$C_{30}$ aryl, or $C_1$-$C_{15}$ alkyl-substituted $C_6$-$C_{30}$ aryl;
R₂ is $C_1$-$C_8$ alkylene;
each p is independently 0 or 1; and
a represents the number of repeating units and is an integer from 1 to 10; and
extruding the melt-mixed mixture.

* * * * *

UNITED STATES PATENT AND TRADEMARK OFFICE
CERTIFICATE OF CORRECTION

| | | |
|---|---|---|
| PATENT NO. | : 8,293,839 B2 | Page 1 of 1 |
| APPLICATION NO. | : 12/485227 | |
| DATED | : October 23, 2012 | |
| INVENTOR(S) | : Bo Young Kim et al. | |

It is certified that error appears in the above-identified patent and that said Letters Patent is hereby corrected as shown below:

In the Specification

Column 4, Chemical Formula 4 is depicted as:

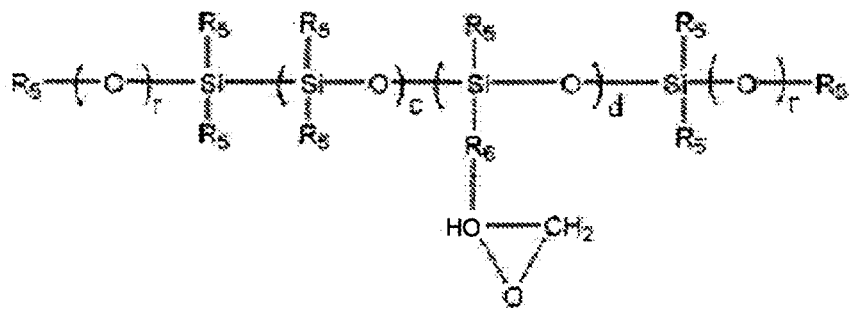

and should be depicted as:

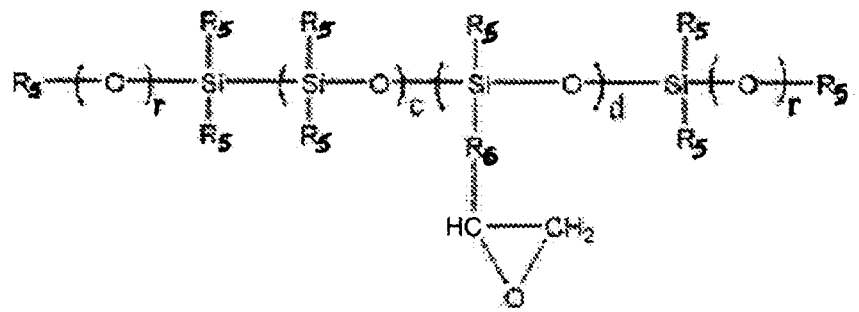

In the Claims

Column 8, Line 50, Claim 2 reads:

"position of claim 1, wherein each of said $R_2$ of said organic"

and should read:

"position of claim 1, wherein each of said $\underline{R_1}$ of said organic"

Signed and Sealed this
Nineteenth Day of February, 2013

Teresa Stanek Rea
*Acting Director of the United States Patent and Trademark Office*